United States Patent
Hong

(10) Patent No.: US 8,848,800 B2
(45) Date of Patent: *Sep. 30, 2014

(54) SIGNAL PROCESSING METHOD AND APPARATUS BASED ON MULTIPLE TEXTURES USING VIDEO SENSOR EXCITATION SIGNALS

(75) Inventor: Sung-Hoon Hong, Daegu (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 350 days.

This patent is subject to a terminal disclaimer.

(21) Appl. No.: 13/222,609

(22) Filed: Aug. 31, 2011

(65) Prior Publication Data
US 2012/0051424 A1    Mar. 1, 2012

(30) Foreign Application Priority Data

Sep. 1, 2010  (KR) .......................... 10-2010-0085608
Aug. 22, 2011  (KR) .......................... 10-2011-0083624

(51) Int. Cl.
*H04B 1/66* (2006.01)
*H04N 19/20* (2014.01)
*H04N 19/51* (2014.01)
*G06K 9/36* (2006.01)

(52) U.S. Cl.
CPC ... *H04N 19/00745* (2013.01); *H04N 19/00387* (2013.01)
USPC ..................................... 375/240.18; 382/232

(58) Field of Classification Search
CPC .................. H04N 19/00745; H04N 19/00387
USPC ........ 348/402.1, 403.1, 169, 143, 222.1, 155, 348/500, 571; 382/236, 232, 238, 190, 181, 382/191, 276, 305; 375/240.01–240.29
See application file for complete search history.

(56) References Cited

U.S. PATENT DOCUMENTS

| | | | |
|---|---|---|---|
| 6,192,150 B1 | 2/2001 | Leow et al. | |
| 6,636,220 B1 * | 10/2003 | Szeliski et al. | 345/475 |
| 7,827,123 B1 | 11/2010 | Yagnik | |
| 7,949,053 B2 * | 5/2011 | Makai et al. | 375/240.26 |
| 2001/0008577 A1 * | 7/2001 | Yamada et al. | 386/98 |
| 2002/0051571 A1 | 5/2002 | Jackway et al. | |
| 2003/0033347 A1 | 2/2003 | Bolle et al. | |
| 2004/0071363 A1 | 4/2004 | Kouri et al. | |

(Continued)

OTHER PUBLICATIONS

Office Action mailed Dec. 2, 2013 in corresponding U.S. Appl. No. 13/222,504.

(Continued)

*Primary Examiner* — Behrooz Senfi
(74) *Attorney, Agent, or Firm* — Staas & Halsey LLP

(57) ABSTRACT

Disclosed herein is a signal processing apparatus and method based on multiple textures using video sensor excitation signals. For this, an input signal that includes a video signal and a sensor signal is divided into unit component signals, and one is selected from a plurality of frames of each unit component signal as a seed signal. A plurality of texture points are detected from the seed signal. The texture points are tracked from the frames of the unit component signal and then spatio-temporal location transform variables for the texture points are calculated. Texture signals are defined using texture points at which the spatio-temporal location transform variables correspond to one another. Each of the texture signals is defined as a sum of a plurality of texture blocks that are outputs of texture synthesis filters that receive video sensor excitation signals as inputs.

18 Claims, 5 Drawing Sheets

(56) References Cited

U.S. PATENT DOCUMENTS

| | | |
|---|---|---|
| 2004/0074136 A1 | 4/2004 | Kouri et al. |
| 2005/0226506 A1* | 10/2005 | Aharon et al. ............... 382/180 |
| 2007/0025482 A1* | 2/2007 | Wells et al. ................. 375/355 |
| 2008/0043848 A1 | 2/2008 | Kuhn |
| 2009/0185747 A1* | 7/2009 | Segall et al. ................ 382/220 |
| 2010/0183225 A1 | 7/2010 | Vantaram et al. |
| 2012/0177121 A1 | 7/2012 | Tripathi et al. |
| 2013/0003854 A1 | 1/2013 | Boon et al. |

OTHER PUBLICATIONS

Office Action mailed Jan. 30, 2014 in corresponding U.S. Appl. No. 13/222,597.

Notice of Allowance mailed Apr. 14, 2014 in corresponding U.S. Appl. No. 13/222,504.

U.S. Appl. No. 13/222,504, filed Aug. 31, 2011, Sung-Hoon Hong, Electronics and Telecommunications Research Institute.

U.S. Appl. No. 13/222,597, filed Aug. 31, 2011, Sung-Hoon Hong, Electronics and Telecommunications Research Institute.

* cited by examiner

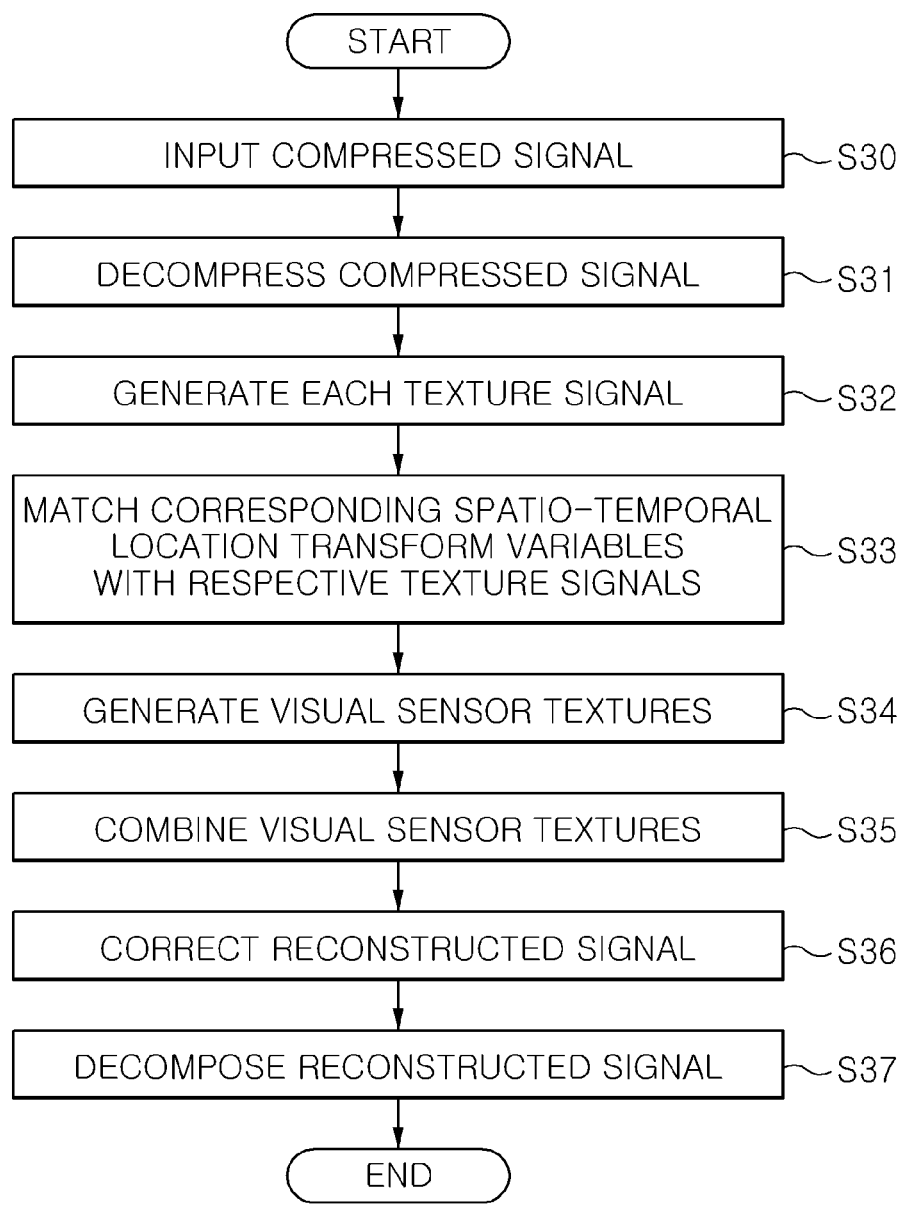

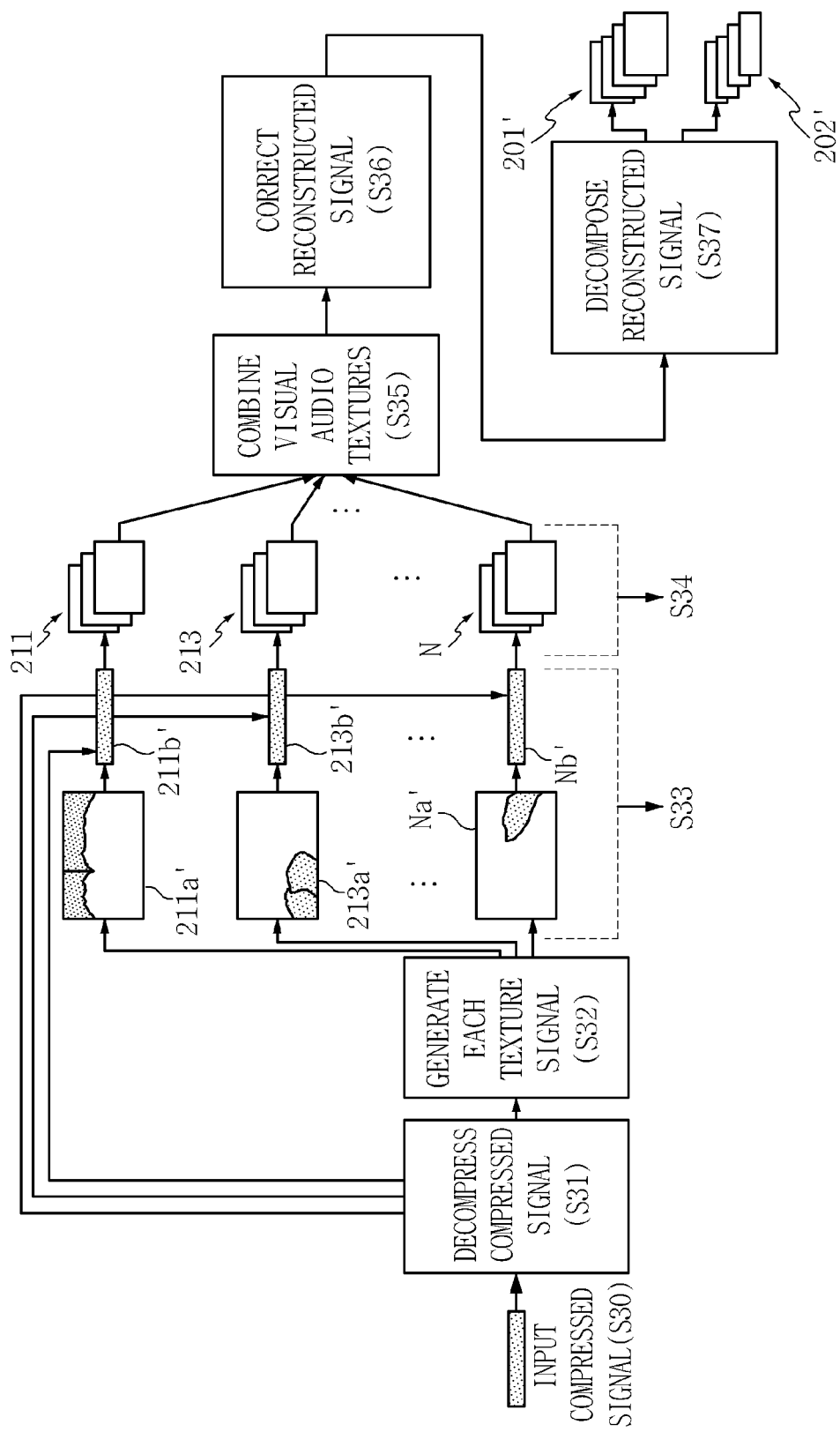

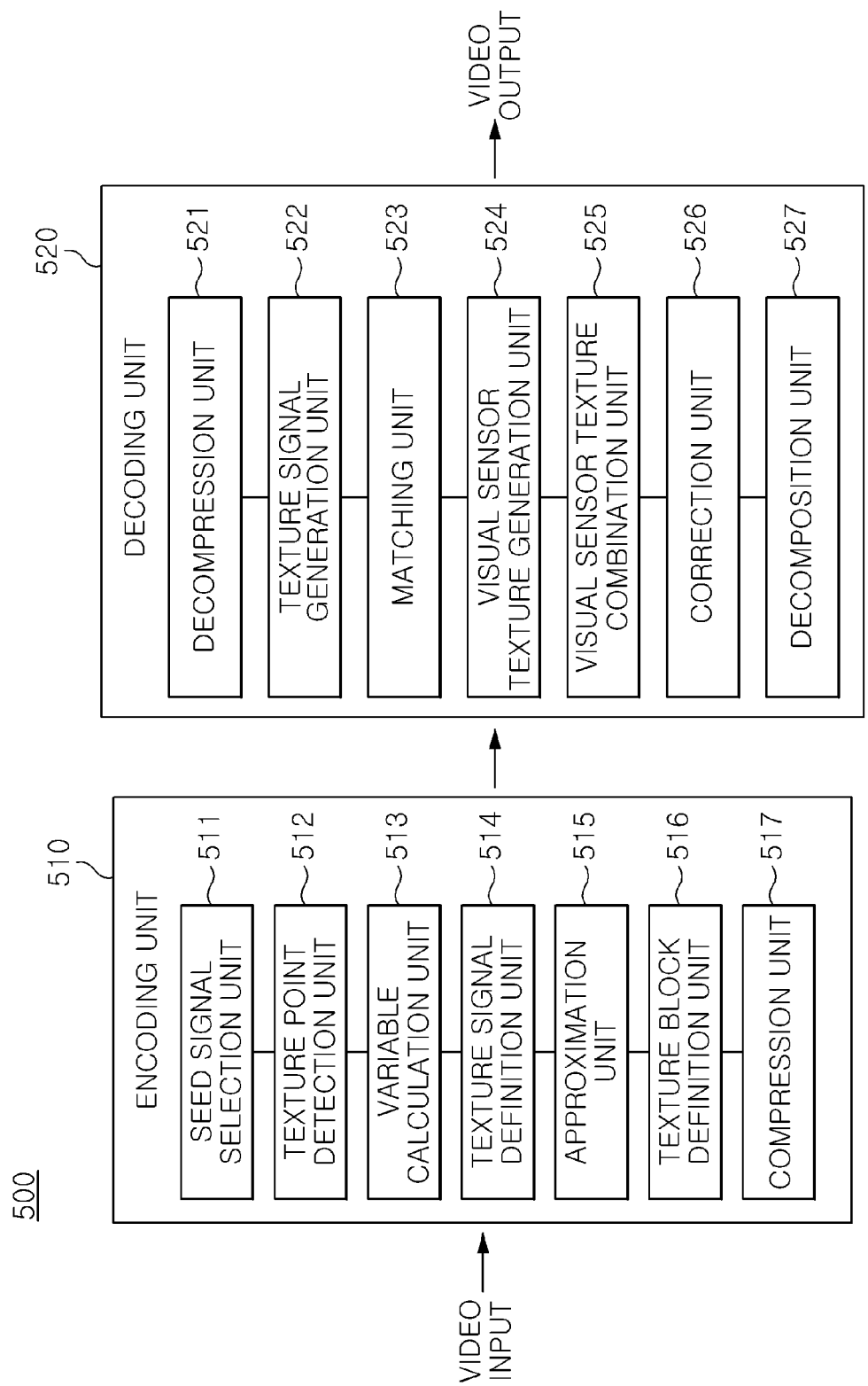

SIGNAL PROCESSING METHOD AND APPARATUS BASED ON MULTIPLE TEXTURES USING VIDEO SENSOR EXCITATION SIGNALS

CROSS REFERENCE TO RELATED ED APPLICATIONS

This application claims the benefit of Korean Patent Application Nos. 10-2010-0085608 filed on Sep. 1, 2010, and 10-2011-0083624 filed on Aug. 22, 2011, which are hereby incorporated by reference in their entirety into this application.

BACKGROUND OF THE INVENTION

1. Technical Field

The present invention relates generally to a signal processing method and apparatus based on multiple textures using video sensor excitation signals. More particularly, the present invention relates to a signal processing apparatus and method based on multiple textures using video sensor excitation signals, which can compress and represent video signals and sensor signals at a low transfer rate.

2. Description of the Related Art

Typical techniques for processing and compressing video signals and sensor signals have been configured to separate video signals and sensor signals and separately compress and represent the video signals and the sensor signals without processing and compression being done in an integrated manner. Techniques for processing and compressing video signals are based on a method of performing transform region processing on motion-estimated signals between video frames using a discrete cosine transform (DCT) or the like. Further, techniques for processing and compressing sensor signals are based on a method of controlling the compression bit rate depending on their own signals or the physical signal characteristics and importance levels of the signals. However, a typical signal compression technique is problematic in that it is difficult to represent the characteristics of various actual signals due to the inaccurate estimation and modeling of the characteristics of video signals and sensor signals. Furthermore, in frames having a large number of video motions or in a sensor signal interval with a large amount of noise, error values in the estimation of a signal representation model increase, so that a problem arises in that the bit rate increases when compression is performed. In order to solve this problem, although video signal compression standards represented by MPEG1/2/4 and H.261/3/4 have been proposed, the deterioration of video quality and audio quality is still serious when video and sensor signals are compressed at a low transfer rate, such as a $1/1000$ bit rate relative to the original signals, at the present time. Furthermore, at present, detailed compression techniques related to sensor signals have not yet been proposed.

SUMMARY OF THE INVENTION

Accordingly, the present invention has been made keeping in mind the above problems occurring in the prior art, and an object of the present invention is to provide a compressed signal obtained by integrating a video signal and a sensor signal and compressing the integrated signal.

Another object of the present invention is to represent various signal characteristics using a plurality of texture signals and the spatio-temporal location transform variables of the texture signals.

A further object of the present invention is to provide a compressed signal, the size of which is remarkably reduced compared to the size of the original signal by compressing and processing the original signal only using a plurality of texture signals and a plurality of spatio-temporal location transform variables corresponding thereto.

Yet another object of the present invention is to provide a compressed video, the size of which is remarkably reduced compared to the original signal, by defining each of a plurality of texture signals as the sum of texture blocks that are outputs of texture synthesis filters which receive video sensor excitation signals, each represented by a Gaussian function, as inputs.

Still another object of the present invention is to reduce the size of a compressed video by approximating a number of predetermined texture signals using similarities between spatio-temporal location transform variables.

Still another object of the present invention is to process videos with optimal video quality at a low transfer rate.

In accordance with an aspect of the present invention to accomplish the above objects, there is provided a signal processing method based on multiple textures, including dividing an input signal that includes a video signal and a sensor signal into unit component signals, and selecting one from a plurality of frames of each unit component signal as a seed signal; detecting a plurality of texture points from the seed signal; tracking the plurality of texture points from the plurality of frames of the unit component signal and then calculating spatio-temporal location transform variables for the respective texture points; defining a plurality of texture signals using texture points at which the spatio-temporal location transform variables correspond to one another; and defining each of the plurality of texture signals as a sum of a plurality of texture blocks that are outputs of texture synthesis filters that respectively receive video sensor excitation signals as inputs.

Preferably, each of the video sensor excitation signals may be represented by a two-dimensional (2D) Gaussian function.

Preferably, the signal processing method may further include compressing the video sensor excitation signals of the plurality of texture blocks that defines each of the plurality of texture signals, variables of the texture synthesis filters for the texture blocks, and spatio-temporal location transform variables respectively corresponding to the texture signals.

Preferably, the compressing may be configured to compress the video sensor excitation signals, the variables of the texture synthesis filters, and the spatio-temporal location transform variables in a bit stream compression manner.

Preferably, the signal processing method may further include merging texture signals, which have spatio-temporal location transform variables for which similarities calculated by obtaining correlation characteristics between texture signals have values falling within a preset threshold value, among the plurality of texture signals, into a single texture signal, thus approximating the texture signals.

Preferably, the detecting the plurality of texture points may be configured to detect, as the texture points, points having variations equal to or greater than a preset value in the plurality of frames.

Preferably, the signal processing method may further include decompressing the compressed video sensor excitation signals, the compressed variables of the texture synthesis filters, and the compressed spatio-temporal location transform variables respectively corresponding to the compressed texture signals; generating the plurality of texture blocks using both the video sensor excitation signals and the variables of the texture synthesis filters, and generating each texture signal by adding the plurality of texture blocks; matching the texture signals with the spatio-temporal location transform variables corresponding to the texture signals; generating visual sensor textures using the texture signals and the spatio-temporal location transform variables; and combining the generated visual sensor textures corresponding to the respective texture signals, to generate a reconstructed signal.

Preferably, the signal processing method may further include correcting the reconstructed signal by filtering artifacts occurring at boundaries of combination of the visual sensor textures.

Preferably, the signal processing method may further include decomposing the reconstructed signal into a reconstructed video signal and a reconstructed sensor signal.

In accordance with another aspect of the present invention to accomplish the above objects, there is provided a signal processing apparatus based on multiple textures, including a seed signal selection unit for dividing an input signal that includes a video signal and a sensor signal into unit component signals, and selecting one from a plurality of frames of each unit component signal as a seed signal; a texture point detection unit for detecting a plurality of texture points from the seed signal; a variable calculation unit for tracking the plurality of texture points from the plurality of frames of the unit component signal and then calculating spatio-temporal location transform variables for the respective texture points; a texture signal definition unit for defining a plurality of texture signals using texture points at which the spatio-temporal location transform variables correspond to one another; and a texture block definition unit for defining each of the plurality of texture signals as a sum of a plurality of texture blocks that are outputs of texture synthesis filters that respectively receive video sensor excitation signals as inputs.

Preferably, each of the video sensor excitation signals may be represented by a two-dimensional (2D) Gaussian function.

Preferably, the signal processing apparatus may further include a compression unit for compressing the video sensor excitation signals of the plurality of texture blocks that defines each of the plurality of texture signals, variables of the texture synthesis filters for the texture blocks, and spatio-temporal location transform variables respectively corresponding to the texture signals.

Preferably, the compression unit may compress the video sensor excitation signals, the variables of the texture synthesis filters, and the spatio-temporal location transform variables in a bit stream compression manner.

Preferably, the signal processing apparatus may further include an approximation unit for merging texture signals, which have spatio-temporal location transform variables for which similarities calculated by obtaining correlation characteristics between texture signals have values falling within a preset threshold value, among the plurality of texture signals, into a single texture signal, thus approximating the texture signals.

Preferably, the texture point detection unit detects, as the texture points, points having variations equal to or greater than a preset value in the plurality of frames.

Preferably, the signal processing apparatus may further include a decompression unit for decompressing the compressed video sensor excitation signals, the compressed variables of the texture synthesis filters, and the compressed spatio-temporal location transform variables respectively corresponding to the compressed texture signals; a texture signal generation unit for generating the plurality of texture blocks using both the video sensor excitation signals and the variables of the texture synthesis filters, and generating each texture signal by adding the plurality of texture blocks; a matching unit for matching the texture signals with the spatio-temporal location transform variables corresponding to the texture signals; a visual sensor texture generation unit for generating visual sensor textures using the texture signals and the spatio-temporal location transform variables; and a visual sensor texture combination unit for combining the generated visual sensor textures corresponding to the respective texture signals, to generate a reconstructed signal.

Preferably, the signal processing apparatus may further include a correction unit for correcting the reconstructed signal by filtering artifacts occurring at boundaries of combination of the visual sensor textures.

Preferably, the signal processing apparatus may further include a decomposition unit for decomposing the reconstructed signal into a reconstructed video signal and a reconstructed sensor signal.

BRIEF DESCRIPTION OF THE DRAWINGS

The above and other objects, features and advantages of the present invention will be more clearly understood from the following detailed description taken in conjunction with the accompanying drawings, in which:

FIG. 3 is an operating flowchart showing the decoding method of the signal processing method based on multiple textures according to the present invention;

FIG. 4 is a diagram showing the decoding method of the signal processing method based on multiple textures according to the present invention; and FIG. 5 is a block diagram showing a signal processing apparatus based on multiple textures according to the present invention.

DESCRIPTION OF THE PREFERRED EMBODIMENTS

Figure 1:
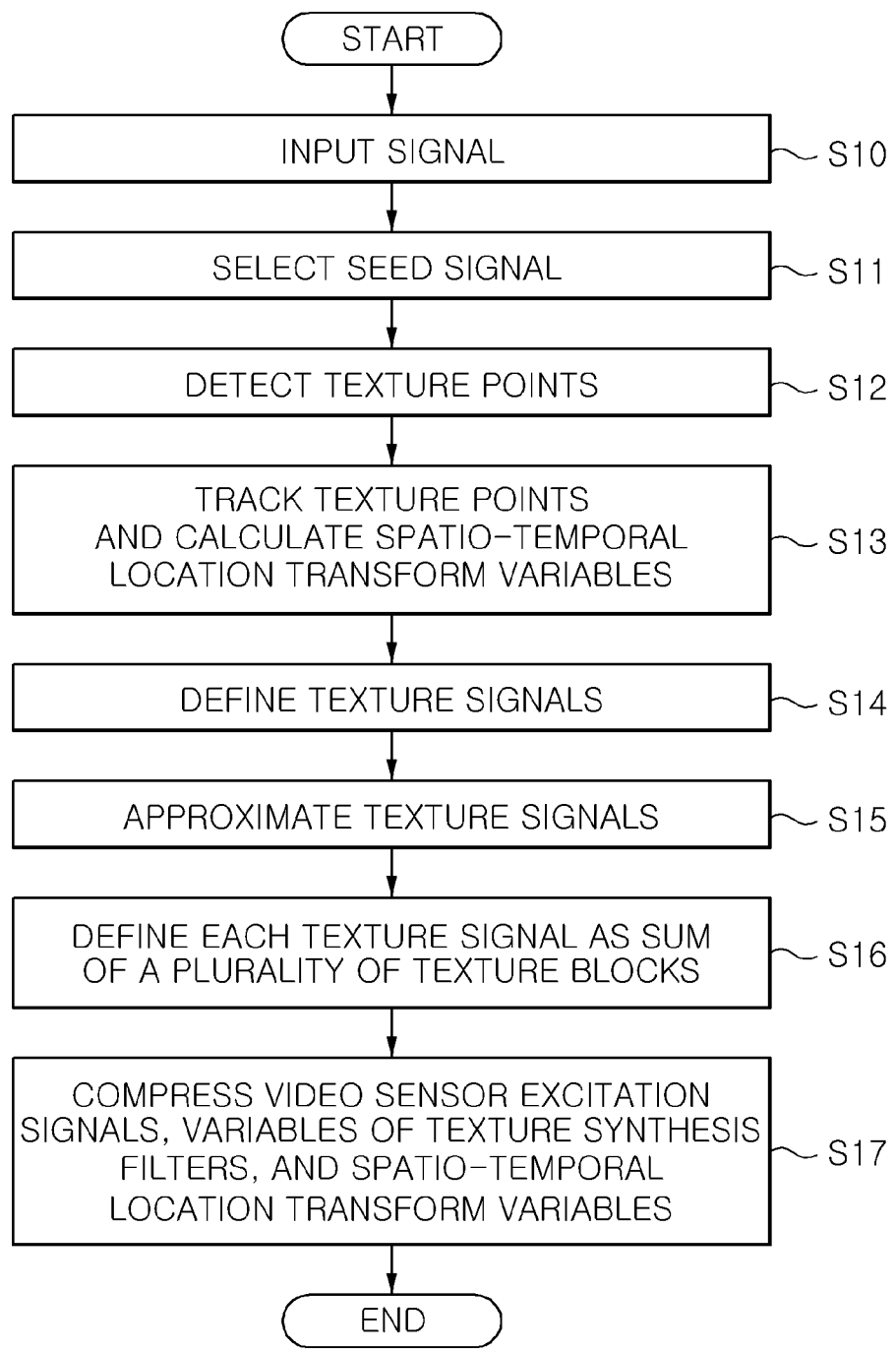
FIG. 1 is an operating flowchart showing the encoding method of a signal processing method based on multiple textures according to the present invention.

The present invention will be described in detail below with reference to the attached drawings. If in the specification, detailed descriptions of well-known functions or configurations may unnecessarily make the gist of the present invention obscure, the detailed descriptions will be omitted. The embodiments of the present invention are provided to describe the present invention more completely to those skilled in the art. Therefore, the shapes or sizes of components in the drawings may be exaggerated for the sake of providing a more definite description.

Hereinafter, the encoding method of a signal processing method based on multiple textures according to the present invention will be described.

Figure 2:
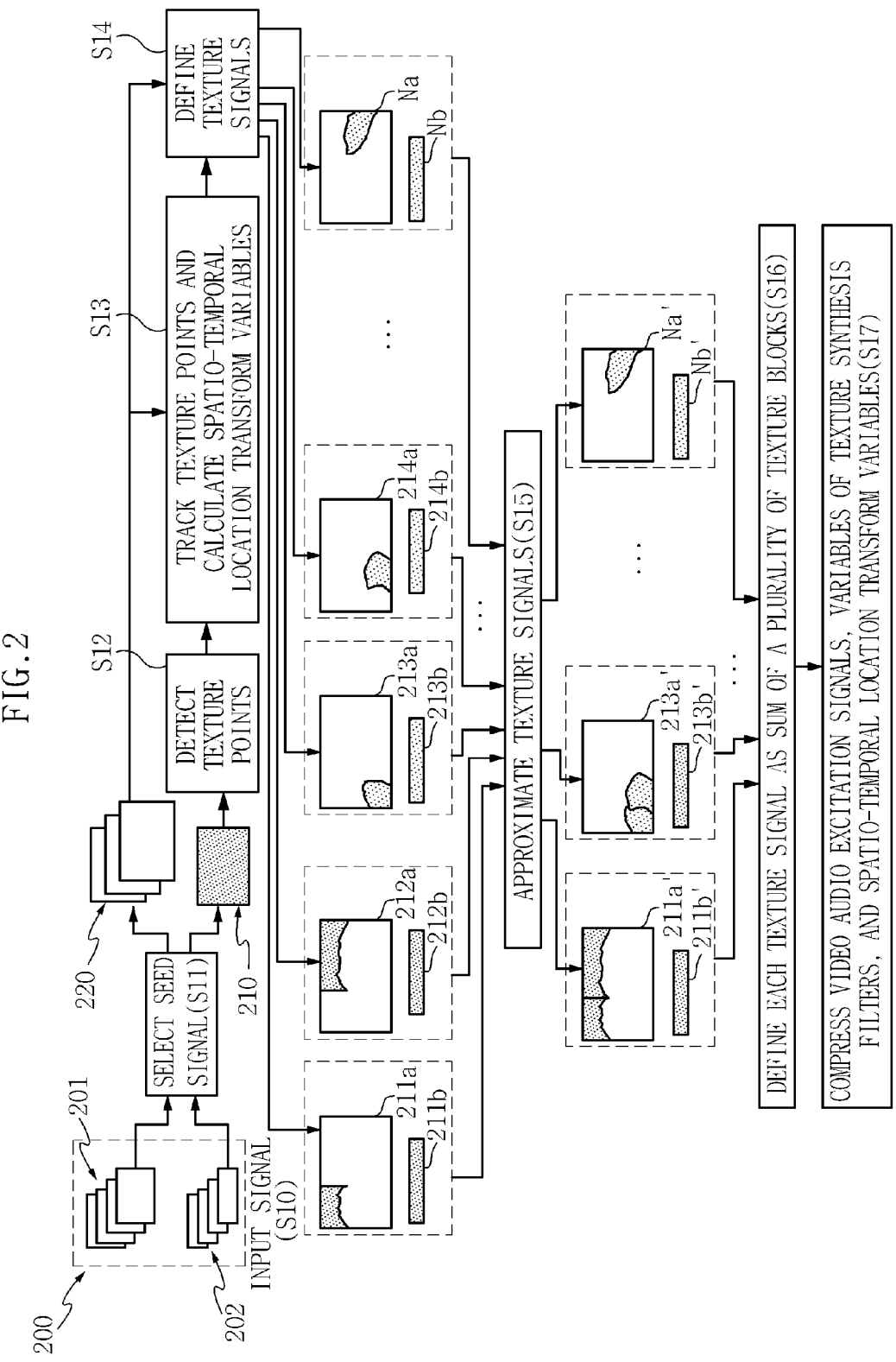
FIG. 2 is a diagram showing the encoding method of the signal processing method based on multiple textures according to the present invention.

FIG. 1 is an operating flowchart showing the encoding method of a signal processing method based on multiple textures according to the present invention. FIG. 2 is a diagram showing the encoding method of the signal processing method based on multiple textures according to the present invention.

Referring to FIGS. 1 and 2, in the encoding method of the signal processing method based on multiple textures according to the present invention, a signal 200 composed of a plurality of frames is input at step S10. Here, the signal 200 includes a video signal 201 and a sensor signal 202. The sensor signal 202 denotes a signal input from a sensor, which may include all types of sensors that can be generally used, for example, a temperature sensor, a chemical sensor, an environment sensor, and a wind sensor.

Further, the input signal 200 is divided into unit component signals, and one of a plurality of frames of each unit component signal is selected as a seed signal 210 at step S11. The remaining frames other than the seed signal 210 of the unit component signal are defined as residual frame signals 220. That is, when the unit component signal is composed of k frames, one seed signal is selected and the remaining k−1 frames are defined as the residual frame signals 220. Here, the term "unit component signal" refers to each unit signal configuring a relevant signal. For example, in the case of a video signal, a shot segment may be a unit component signal, and such a shot segment may correspond to images continuously captured by a single camera.

A plurality of texture points are detected from the seed signal 210, selected at step S11, at step S12. In this case, in the plurality of frames of each unit component signal, points having variations equal to or greater than a preset value can be detected as texture points. That is, when specific points in the seed signal 210 and the residual frame signals 220 exhibit variations equal to or greater than the preset value, the specific points can be detected as the texture points.

Further, the plurality of texture points are tracked from the plurality of frames of the unit component signal and spatio-temporal location transform variables for the respective texture points are calculated at step S13. That is, the spatio-temporal location transform variables that define variations in the texture points in the seed signal 210 and the residual frame signals 220 are calculated. Each of the spatio-temporal location transform variables may have the form of a function indicating a variation or the like in the position of a relevant texture point over time.

A plurality of texture signals 211a, 212a, 213a, 214a, and Na are defined using texture points at which the spatio-temporal location transform variables 211b, 212b, 213b, 214b, and Nb calculated at step S13 mutually correspond to one another at step S14. In this case, a single texture signal can be defined by associating texture points at which the spatio-temporal location transform variables 211b, 212b, 213b, 214b, and Nb are mutually identical to one another.

Further, in the plurality of texture signals, texture signals having similar spatio-temporal location transform variables are merged into a single texture signal and are then approximated at step S15. In this case, similarities between the spatio-temporal location transform variables can be calculated by obtaining correlations between the texture signals. Further, texture signals for which similarities between spatio-temporal location transform variables have values falling within a preset threshold value may be merged into a single texture signal. In FIG. 2, the first texture signal 211a and the second texture signal 212a, for which the spatio-temporal location transform variables are assumed to have higher similarity, are merged with each other, and in accordance with this merging, the first spatio-temporal location transform variable 211b and the second spatio-temporal location transform variable 212b are merged with each other. Accordingly, a first approximate texture signal 211a' and a first approximate spatio-temporal location transform variable 211b' are generated. Further, the third texture signal 213a and the fourth texture signal 214a are merged with each other, and in accordance with this merging, the third spatio-temporal location transform variable 213b and the fourth spatio-temporal location transform variable 214b are merged with each other. Accordingly, a second approximate texture signal 213a' and a second approximate spatio-temporal location transform variable 213b' are generated.

Further, each of the plurality of texture signals 211a, 212a, 213a, 214a, and Na is defined as the sum of a plurality of texture blocks at step S16. If step S15 has been performed, each of the plurality of approximate texture signals 211', 213', and Na' may be defined as the sum of a plurality of texture blocks. In this case, each texture block may be defined as the output of a texture synthesis filter that receives a video sensor excitation signal as an input. Further, the video sensor excitation signal may be represented by a two-dimensional (2D) Gaussian function. The video sensor excitation signal, that is, the Gaussian function, has a size variable 'G', a mean variable 'In' and a variance 'a' as model variables. Furthermore, such a texture synthesis filter has a transform region filter coefficient given in the following Equation 1 as a model variable:

$$h = \begin{bmatrix} h_{1,1} & h_{1,2} & \ldots & h_{1,M} \\ h_{2,1} & h_{2,2} & \ldots & h_{2,M} \\ \vdots & \vdots & \vdots & \vdots \\ h_{M,1} & h_{M,2} & \ldots & h_{M,M} \end{bmatrix} \quad (1)$$

Values for the variables of the video sensor excitation signal, that is, values G, m and a, and values for variables h of the texture synthesis filter are obtained to minimize a difference between an estimated texture value and an original texture signal value in a transform region. An estimated texture signal R in the transform region is represented by the following Equation 2:

$$R = E \cdot H \quad (2)$$

E and H denote an excitation signal vector and a texture synthesis filter coefficient vector, respectively, in the transform region, and '·' denotes the product of individual components of the vectors. The excitation signal vector E is approximated to a 2D Gaussian function, and the texture synthesis filter H has the characteristics that most variables have values of '0' and that variable values appear only in some regions, depending on the characteristics of a texture transform region. Therefore, the signal processing method of the present invention is capable of performing compression at a very low bit rate using a variable length encoder or an arithmetic encoder, and uses the same structure both for the video signal 201 and for the sensor signal 202, thus enabling integrated signal processing and compression to be efficiently performed.

Furthermore, the respective video sensor excitation signals of a plurality of texture blocks that define each of the plurality of texture signals 211a, 212a, 213a, 214a, and Na, the variables of the respective texture synthesis filters for the texture blocks, and the plurality of spatio-temporal location transform variables 211b, 212b, 213b, 214b and Nb respectively corresponding to the plurality of texture signals 211a, 212a, 213a, 214a, and Na are compressed at step S17. Further, at step S17, on the assumption that the step S15 of approximating the texture signals has been performed, the respective video sensor excitation signals of the plurality of texture blocks that define each of the plurality of approximate texture signals 211a', 213a', and Na', the variables of the respective texture synthesis filters for the texture blocks, and the plurality of approximate spatio-temporal location transform variables 211b', 213b' and Nb' respectively corresponding to the plurality of approximate texture signals may be compressed. Here, compression may be performed in a bit stream compression manner.

Hereinafter, the encoding method of the signal processing method based on multiple textures according to the present invention will be described with reference to the following equations.

The texture points can be detected as follows. First, for an input video $\{I(x, y, k)\}_{x=1, 2, \ldots, w, y=1, 2, \ldots, h}$ composed of k frames, an autocorrelation matrix $E\{\vec{T}^{(j)}\vec{T}^{(j)t}\}$ is calculated, where $\vec{T}^{(j)}$ denotes the surrounding window signal of a point when $\{x, y\}$ satisfies $\{I(x^{(j)}, y^{(j)}, k)\}_{x^{(j)}-w' \le x \le x^{(j)}+w', y^{(j)}-h' \le y \le y^{(j)}+h'}$. Further, x and y denote pixel points in an x axis direction and a y axis direction, respectively, and $E\{\bullet\}$ is defined by a statistical expectation operator.

From eigenvalues calculated at the pixel point $\{x, y\}$ by $E\{\vec{T}^{(x,y)}\vec{T}^{(x,y)t}\}$, that is, $\lambda_1^{(x,y)}$ and $\lambda_2^{(x,y)}$, a texture point matrix $\{p(x, y, k)\}_{x=1, 2, \ldots, w, y=1, 2, \ldots, h}$ can be obtained by the following Equation 3:

$$p(x, y, k) = 1 \quad \text{if } \lambda_1^{(j)} > \theta_1 \text{ and } \lambda_2^{(j)} > \theta_2 \quad (3)$$
$$0 \quad \text{elsewhere}$$

where $\theta_1$ and $\theta_2$ correspond to preset threshold values. In Equation 3, when the $\lambda_1^{(x,y)}$ and $\lambda_2^{(x,y)}$ at the specific pixel position are greater than $\theta_1$ and $\theta_2$, respectively, the relevant specific pixel is defined as 1. Further, when $\lambda_1^{(x,y)}$ and $\lambda_2^{(x,y)}$ at the specific pixel position are less than $\theta_1$ and $\theta_2$, respectively, the relevant specific pixel is defined as 0, and then the texture point matrix is obtained.

Further, the plurality of spatio-temporal location transform variables that define respective texture signals, and the related texture signals can be defined by the following Equation 4:

$$I^{(i)}(x,y,k) = w^{(i)}(x,y)I(x,y,k) \quad (4)$$

where $w^{(i)}(x, y)$ can be defined by the following Equation 5:

$$w^{(i)}(x, y) = 1 \quad \text{if } x^{(i)} - w'/2 \le x \le x^{(i)} + w'/2 \text{ and } p(x, y, k) = 1 \quad (5)$$
$$0 \quad \text{elsewhere}$$

Further, the input video $\{I(x, y, k)\}_{x=1, 2, \ldots, w, y=1, 2, \ldots, h}$ composed of k frames can be defined by the sum of N texture signals, as given by the following Equation 6:

$$I(x, y, k) = \sum_{i=1}^{N} I^{(i)}(x, y, k) \quad (6)$$

Furthermore, the ith segmented texture signal in Equation 6 can be approximated and represented by the following Equation 7:

$$I^{(i)}(x,y,k) = T^{(i)}(I^{(i)}(x-dx_i, y-dy_i, l)) + e^{(i)}(x,y,k) \quad (7)$$

where $T^{(i)}(\bullet)$ denotes a transform function, $I^{(i)}(x,y,l)$ denotes the ith segmented texture signal of the lth frame of the input video, $\{dx_i, dy_i\}$ denotes position transform vectors in x and y axis directions, and $e^{(i)}(x,y,k)$ denotes an approximate error signal estimated from $I^{(i)}(x,y,k)$. Further, in Equation 7, a frame number k falls within a range from l+1 to l+M. Equation 7 can be approximated using Taylor expansion, as given by the following Equation 8:

$$I^{(i)}(x, y, k) = T^{(i)}\left(I^{(i)}(x, y, l) - [gx_i, gy_i]\begin{bmatrix}dx_i\\dy_i\end{bmatrix}\right) + e^{(i)}(x, y, k) \quad (8)$$

where $gx_i$ and $gy_i$ respectively denote the sums of gradient values of $I^{(i)}(x,y,k)$ in the x and y axis directions. Further, the theorem of the sum of squares of the estimated error signal can be represented by the following Equation 9:

$$\varepsilon = \sum_{x=1}^{w}\sum_{y=1}^{h} e(x, y, k)^2 \quad (9)$$
$$= \sum_{i=1}^{N} e^{(i)}(x, y, k)^2$$
$$= \sum_{i=1}^{N}\sum_{x=1}^{w}\sum_{y=1}^{h}\left[I^{(i)}(x, y, k) - T^{(i)}\left(I^{(i)}(x, y, l) - [gx_i, gy_i]\begin{bmatrix}dx_i\\dy_i\end{bmatrix}\right)\right]^2$$

In this case, the value of $\{dx_i, dy_i, T^{(i)}(\bullet)\}$ can be obtained by assuming the minimization of the magnitude of $\epsilon$ which is the sum of squares of the estimated error signal. That is, the value of $\{dx_i, dy_i, T^{(i)}(\bullet)\}$ is obtained by calculating the following Equations 10 and 11:

$$\left.\frac{\partial \varepsilon}{\partial \vec{d}}\right|_{T^{(i)}(\cdot)} = 0 \quad (10)$$

$$\left.\frac{\partial \varepsilon}{\partial T^{(i)}}\right|_{\vec{d}} = 0 \quad (11)$$

In this case, when $T^{(i)}(\bullet)$ is assumed to be an identity transform formular, the following Equation 12 can be obtained using the above Equations 9 and 10, $$\left.\frac{\partial \varepsilon}{\partial \vec{d}}\right|_{T^{(i)}(\cdot)} = \quad (12)$$
$$\sum_{i=1}^{N}\sum_{x=1}^{w}\sum_{y=1}^{h}\left[I^{(i)}(x, y, k) - \left(I^{(i)}(x, y, l)[gx_i, gy_i]\begin{bmatrix}dx_i\\dy_i\end{bmatrix}\right)\right]\begin{bmatrix}gx_i\\gy_i\end{bmatrix} = 0$$

Further, when Equation 12 is solved, the following Equation 13 for $\{dx_i, dy_i\}$ can be obtained.

$$\begin{bmatrix}dx_i\\dy_i\end{bmatrix} = \frac{\sum_{x=1}^{w}\sum_{y=1}^{h}[I^{(i)}(x, y, k) - I^{(i)}(x, y, l)]\begin{bmatrix}gx_i\\gy_i\end{bmatrix}}{\sum_{x=1}^{w}\sum_{y=1}^{h}\begin{bmatrix}gx_i\\gy_i\end{bmatrix}[gx_i \; gy_i]} \quad (13)$$

Furthermore, the transform function $T^{(i)}(\bullet)$ as given by the following Equation 14 can be obtained using $\{dx_i, dy_i\}$ obtained in Equation 13 and the above Equation 11, $$T^{(i)} = \sum_{i=1}^{N}\sum_{x=1}^{w}\sum_{y=1}^{h}\left[I^{(i)}(x,y,k) - T^{(i)}\left(I^{(i)}(x,y,l) - [gx_i, gy_i]\begin{bmatrix}dx_i\\dy_i\end{bmatrix}\right)\right]\left(I^{(i)}(x,y,l) - [gx_i, gy_i]\begin{bmatrix}dx_i\\dy_i\end{bmatrix}\right) \quad (14)$$

Equations 10 and 11 are rearranged, and then $\{I^{(i)}(x,y,l+1)\}_{x=1,2,\ldots,w,\,y=1,2,\ldots,h}$ can be obtained from the transform function $\{T_{l,l+1}^{(i)}\}_{i=1,2,\ldots,N}$ of $\{I^{(i)}(x,y,l)\}_{x=1,2,\ldots,w,\,y=1,2,\ldots,h}$. Further, $\{I^{(i)}(x,y,l+M)\}_{x=1,2,\ldots,w,\,y=1,2,\ldots,h}$ can be obtained from the transform function $\{T_{l,l+M}^{(i)}\}_{i=1,2,\ldots,N}$ of $\{I^{(i)}(x,y,l)\}_{x=1,2,\ldots,w,\,y=1,2,\ldots,h}$. Furthermore, $\{I(x,y,k)\}_{x=1,2,\ldots,w,\,y=1,2,\ldots,h,\,k=l,l+1,\ldots,l+M}$ can be represented by the seed signal $\{I^{(i)}(x,y,l)\}_{x=1,2,\ldots,w,\,y=1,2,\ldots,h}$ and the transform function $\{T_{l,l+j}^{(i)}\}_{i=1,2,\ldots,N,\,j=1,2,\ldots,M}$ using Equations 3 to 14. Furthermore, the approximation of the texture signal can be achieved by calculating the similarity between $\{T_{l,l+j}^{(i)}\}_{i=1,2,\ldots,N,\,j=1,2,\ldots,M}$.

Hereinafter, the decoding method of the signal processing method based on multiple textures according to the present invention will be described.

FIG. 3 is an operating flowchart showing the decoding method of the signal processing method based on multiple textures according to the present invention. FIG. 4 is a diagram showing the decoding method of the signal processing method based on multiple textures according to the present invention.

Referring to FIGS. 3 and 4, in the decoding method of the signal processing method based on multiple textures according to the present invention, a compressed signal is input at step S30. In this case, the compressed signal may be a signal in which respective video sensor excitation signals of a plurality of texture blocks that define each of a plurality of texture signals, the variables of texture synthesis filters for the texture blocks, and a plurality of spatio-temporal location transform variables corresponding to the respective texture signals are compressed. Of course, the compressed signal may also be a signal in which respective video sensor excitation signals of a plurality of texture blocks that define each of a plurality of approximate texture signals, the variables of texture synthesis filters for the texture blocks, and a plurality of approximate spatio-temporal location transform variables are compressed. Further, in the compressed signal, the video sensor excitation signals, the variables of the texture synthesis filters, and the plurality of spatio-temporal location transform variables may be compressed in a bit stream compression manner.

The compressed signal is decompressed at step S31. That is, the compressed video sensor excitation signals, the compressed variables of the texture synthesis filters, and the plurality of compressed spatio-temporal location transform variables corresponding to the respective texture signals are decompressed.

Furthermore, a plurality of texture blocks are generated using the decompressed video sensor excitation signals and the decompressed variables of the texture synthesis filters, and each texture signal is generated by adding the plurality of texture blocks at step S32. The texture signal at that time may be a texture signal approximated during an encoding procedure.

In a plurality of generated texture signals and the plurality of decompressed spatio-temporal location transform variables, each texture signal and a spatio-temporal location transform variable corresponding to the texture signal match each other in a one-to-one correspondence at step S33. Of course, each approximate texture signal and an approximate spatio-temporal location transform variable corresponding to the approximate texture signal may match each other. In FIG. 4, a first approximate texture signal 211a' matches a first approximate spatio-temporal location transform variable 211b', and a second approximate texture signal 213a' matches a second approximate spatio-temporal location transform variable 213b'. An Nth approximate texture signal Na' matches an Nth approximate spatio-temporal location transform variable Nb'.

At step S34, visual sensor textures are generated using the texture signals and the spatio-temporal location transform variables that have matched at step S33. In detail, the spatio-temporal location transform variables defining the motions of the texture points over time are applied to the texture signals, and thus visual sensor textures, each composed of a plurality of frames, for respective texture signals are generated. Of course, the visual sensor textures can also be generated using the approximate texture signals and the approximate spatio-temporal location transform variables that have matched. In FIG. 4, a first visual sensor texture 211 composed of a plurality of frames is generated using the first approximate texture signal 211a' and the first approximate spatio-temporal location transform variable 211b'. Further, a second visual sensor texture 213 composed of a plurality of frames is generated using the second approximate texture signal 213a' and the second approximate spatio-temporal location transform variable 213b'. Furthermore, an Nth visual sensor texture N composed of a plurality of frames is generated using the Nth approximate texture signal Na' and the Nth approximate spatio-temporal location transform variable Nb'.

The visual sensor textures generated to correspond to the respective texture signals at step S34 are combined at step S35. The generated visual sensor textures are combined, and thus a plurality of frames of a unit component signal are entirely reconstructed. In FIG. 4, the first visual sensor texture 211, the second visual sensor texture 213, and the Nth visual sensor texture N are combined.

Artifacts occurring at the combination boundary of the plurality of visual sensor textures combined at step S35 are corrected via the filtering of the artifacts at step S36. That is, the plurality of visual sensor textures combined at step S35 are reconstructed as the simple sum thereof, so that artifacts may occur at the boundaries between the visual sensor textures. The filtering operation for eliminating these artifacts is performed, and thus a corrected, reconstructed signal is generated.

The reconstructed signal of the unit component signal obtained at step S36 is decomposed, and then a reconstructed video signal 201' and a reconstructed sensor signal 202' are finally generated at step S37. In the present invention, the signal including the video signal and the sensor signal is represented using a model based on excitation signals, so that the decomposition of the signal is possible, and cross estimation between the video signal and the sensor signal becomes possible.

Hereinafter, the construction and operation of the signal processing apparatus based on multiple textures according to the present invention will be described.

FIG. 5 is a block diagram showing the construction of a signal processing apparatus based on multiple textures according to the present invention.

Referring to FIG. 5, a signal processing apparatus 500 based on multiple textures according to the present invention may be configured to include an encoding unit 510 and a decoding unit 520.

The encoding unit 510 includes a seed signal selection unit 511, a texture point detection unit 512, a variable calculation unit 513, a texture signal definition unit 514, and a texture block definition unit 516. The encoding unit 510 may further include an approximation unit 515 and a compression unit 517.

The seed signal selection unit 511 divides an input signal into unit component signals, and selects one from a plurality of frames of each unit component signal as a seed signal. Further, the seed signal selection unit 511 defines the remaining frames other than the seed signal of the unit component signal as residual frame signals. That is, when the unit component signal is composed of k frames, the seed signal selection unit 511 selects one seed signal, and defines the remaining k−1 frames as the residual frame signals 220. In this case, the unit component signal corresponds to each unit signal constituting a relevant signal.

The texture point detection unit 512 detects a plurality of texture points from the seed signal selected by the seed signal selection unit 511. In this case, the texture point detection unit 512 may detect points, having variations equal to or greater than a preset value, as the texture points, from the plurality of frames of the unit component signal. That is, when specific points in the seed signal and in the residual frame signals exhibit variations equal to or greater than the preset value, the texture point detection unit 512 may detect the relevant specific points as the texture points.

The variable calculation unit 513 tracks a plurality of texture points from the plurality of frames of the unit component signal, and then calculates spatio-temporal location transform variables for the respective texture points. That is, the variable calculation unit 513 calculates the spatio-temporal location transform variables, which define variations in texture points in the seed signal and the residual frame signals. Each of the spatio-temporal location transform variables may have the form of a function indicating a variation or the like in the position of a relevant texture point over time.

The texture signal definition unit 514 defines a plurality of texture signals using texture points at which the spatio-temporal location transform variables calculated by the variable calculation unit 513 mutually correspond to one another. In this case, the texture signal definition unit 514 may define a single texture signal by associating texture points at which the spatio-temporal location transform variables are mutually identical to one another.

The approximation unit 515 approximates the texture signals by merging texture signals, having similar spatio-temporal location transform variables, among the plurality of texture signals, into a single texture signal. That is, the approximation unit 515 may generate a plurality of approximate texture signals and a plurality of approximate spatio-temporal location transform variables in which the plurality of texture signals and the plurality of spatio-temporal location transform variables are respectively approximated. In this case, the approximation unit 515 may calculate similarities between the spatio-temporal location transform variables by obtaining correlation characteristics between the texture signals. Further, the approximation unit 515 may merge texture signals for which the similarities between the spatio-temporal location transform variables have values falling within a preset threshold value into a single texture signal.

The texture block definition unit 516 defines each of the plurality of texture signals as the sum of a plurality of texture blocks. In this case, each texture block may be defined as the output of a texture synthesis filter that receives a video sensor excitation signal as an input. Further, the video sensor excitation signal may be represented by a 2D Gaussian function. Of course, the texture block definition unit 516 may define each of a plurality of approximate texture signals as the sum of a plurality of texture blocks.

The compression unit 517 compresses the video sensor excitation signals of the plurality of texture signals, the variables of the texture synthesis filters for the texture signals, and the plurality of spatio-temporal location transform variables respectively corresponding to the texture signals. Of course, the compression unit 517 may compress the video sensor excitation signals of the plurality of approximate texture signals, the variables of the texture synthesis filters for the approximate texture signals, and the plurality of approximate spatio-temporal location transform variables.

The decoding unit 520 includes a decompression unit 521, a texture signal generation unit 522, a matching unit 523, a visual sensor texture generation unit 524, and a visual sensor texture combination unit 525. The decoding unit 520 may further include a correction unit 526.

The decompression unit 521 receives a compressed signal from the encoding unit 510, and then decompresses the compressed signal. The decompression unit 521 decompresses video sensor excitation signals and the variables of texture synthesis filters which are used to define each of a plurality of compressed texture signals, and a plurality of compressed spatio-temporal location transform variables respectively corresponding to the texture signals.

The texture signal generation unit 522 generates a plurality of texture blocks using both the video sensor excitation signals and the variables of the texture synthesis filters, and generates each texture signal by adding the plurality of texture blocks.

The matching unit 523 matches respective texture signals and spatio-temporal location transform variables corresponding to the texture signals, among the plurality of texture signals generated by the texture signal generation unit 522, and the plurality of spatio-temporal location transform variables, with one another in a one-to-one correspondence. It is apparent that the matching unit 523 may also match respective approximate texture signals with approximate spatio-temporal location transform variables corresponding to the approximate texture signals.

The visual sensor texture generation unit 524 generates visual sensor textures using the texture signals and the spatio-temporal location transform variables that have matched one another. In detail, the visual sensor texture generation unit 524 generates each visual sensor texture composed of a plurality of frames of a relevant texture signal by applying the spatio-temporal location transform variables, which define the motions or like of the texture points over time, to the texture signal. Of course, the visual sensor texture generation unit 524 may generate visual sensor textures using the approximate texture signals and the approximate spatio-temporal location transform variables that have matched one another.

The visual sensor texture combination unit 525 combines the visual sensor textures generated by the visual sensor texture generation unit 524 to correspond to the respective texture signals. The visual sensor textures are combined, so that the plurality of frames of the unit component signal are entirely reconstructed.

The correction unit 526 corrects artifacts occurring at the boundaries of the combination of the combined visual sensor textures by filtering the artifacts. That is, the visual sensor textures combined by the visual sensor texture combination unit 525 are reconstructed as the simple sum thereof, and thus artifacts may be caused at the boundaries between the visual sensor textures. The correction unit 526 performs a filtering operation for eliminating such artifacts, thus generating a corrected, reconstructed signal.

A decomposition unit 527 finally generates the reconstructed video signal and the reconstructed sensor signal by decomposing the reconstructed unit component signal obtained by the correction unit 526. In the present invention, the signal including the video signal and the sensor signal is represented using a model based on excitation signals, so that the decomposition of the signal is possible, and cross estimation between the video signal and the sensor signal becomes possible.

As described above, in the signal processing method and apparatus based on multiple textures according to the present invention, part or all of the above-described embodiments can be selectively combined and constructed so that various modifications are possible, without the construction and scheme of the above-described embodiments being limitedly applied.

According to the present invention, a compressed signal obtained by integrating a video signal and a sensor signal and compressing the integrated signal can be provided.

Further, the present invention is capable of representing various signal characteristics using a plurality of texture signals and the spatio-temporal location transform variables of the texture signals.

Furthermore, the present invention is capable of providing a compressed signal, the size of which is remarkably reduced compared to the size of the original signal because the original signal can be compressed and processed only using a plurality of texture signals and a plurality of spatio-temporal location transform variables corresponding thereto. Furthermore, the present invention can provide a compressed signal, the size of which is remarkably reduced compared to the original signal, by defining each of a plurality of texture signals as the sum of texture blocks that are outputs of texture synthesis filters which receive video sensor excitation signals, each represented by a Gaussian function, as inputs.

Furthermore, the present invention can further reduce the size of a compressed signal by approximating a number of predetermined texture signals using similarities between spatio-temporal location transform variables.

Furthermore, the present invention can process videos with optimal video quality at a low transfer rate. That is, the present invention can minimize the degradation of video quality at a low transfer rate such as $1/500$ bit rate.

What is claimed is:

1. A signal processing method based on multiple textures, comprising:
    dividing an input signal that includes a video signal and a sensor signal into unit component signals, and selecting one from a plurality of frames of each unit component signal as a seed signal;
    detecting a plurality of texture points from the seed signal;
    tracking the plurality of texture points from the plurality of frames of the unit component signal and then calculating spatio-temporal location transform variables for the respective texture points;
    defining a plurality of texture signals using texture points at which the spatio-temporal location transform variables correspond to one another; and
    defining each of the plurality of texture signals as a sum of a plurality of texture blocks that are outputs of texture synthesis filters that respectively receive video sensor excitation signals as inputs.

2. The signal processing method of claim 1, wherein each of the video sensor excitation signals is represented by a two-dimensional (2D) Gaussian function.

3. The signal processing method of claim 1, further comprising compressing the video sensor excitation signals of the plurality of texture blocks that defines each of the plurality of texture signals, variables of the texture synthesis filters for the texture blocks, and spatio-temporal location transform variables respectively corresponding to the texture signals.

4. The signal processing method of claim 3, wherein the compressing is configured to compress the video sensor excitation signals, the variables of the texture synthesis filters, and the spatio-temporal location transform variables in a bit stream compression manner.

5. The signal processing method of claim 1, further comprising merging texture signals, which have spatio-temporal location transform variables for which similarities calculated by obtaining correlation characteristics between texture signals have values falling within a preset threshold value, among the plurality of texture signals, into a single texture signal, thus approximating the texture signals.

6. The signal processing method of claim 1, wherein the detecting the plurality of texture points is configured to detect, as the texture points, points having variations equal to or greater than a preset value in the plurality of frames.

7. The signal processing method of claim 3, further comprising:
    decompressing the compressed video sensor excitation signals, the compressed variables of the texture synthesis filters, and the compressed spatio-temporal location transform variables respectively corresponding to the compressed texture signals;
    generating the plurality of texture blocks using both the video sensor excitation signals and the variables of the texture synthesis filters, and generating each texture signal by adding the plurality of texture blocks;
    matching the texture signals with the spatio-temporal location transform variables corresponding to the texture signals;
    generating visual sensor textures using the texture signals and the spatio-temporal location transform variables; and
    combining the generated visual sensor textures corresponding to the respective texture signals, to generate a reconstructed signal.

8. The signal processing method of claim 7, further comprising correcting the reconstructed signal by filtering artifacts occurring at boundaries of combination of the visual sensor textures.

9. The signal processing method of claim 7, further comprising decomposing the reconstructed signal into a reconstructed video signal and a reconstructed sensor signal.

10. A signal processing apparatus based on multiple textures, comprising:
    a seed signal selection unit for dividing an input signal that includes a video signal and a sensor signal into unit component signals, and selecting one from a plurality of frames of each unit component signal as a seed signal;
    a texture point detection unit for detecting a plurality of texture points from the seed signal;
    a variable calculation unit for tracking the plurality of texture points from the plurality of frames of the unit component signal and then calculating spatio-temporal location transform variables for the respective texture points;
    a texture signal definition unit for defining a plurality of texture signals using texture points at which the spatio-temporal location transform variables correspond to one another; and a texture block definition unit for defining each of the plurality of texture signals as a sum of a plurality of texture blocks that are outputs of texture synthesis filters that respectively receive video sensor excitation signals as inputs.

11. The signal processing apparatus of claim 10, wherein each of the video sensor excitation signals is represented by a two-dimensional (2D) Gaussian function.

12. The signal processing apparatus of claim 10, further comprising a compression unit for compressing the video sensor excitation signals of the plurality of texture blocks that defines each of the plurality of texture signals, variables of the texture synthesis filters for the texture blocks, and spatio-temporal location transform variables respectively corresponding to the texture signals.

13. The signal processing apparatus of claim 12, wherein the compression unit compresses the video sensor excitation signals, the variables of the texture synthesis filters, and the spatio-temporal location transform variables in a bit stream compression manner.

14. The signal processing apparatus of claim 10, further comprising an approximation unit for merging texture signals, which have spatio-temporal location transform variables for which similarities calculated by obtaining correlation characteristics between texture signals have values falling within a preset threshold value, among the plurality of texture signals, into a single texture signal, thus approximating the texture signals.

15. The signal processing apparatus of claim 10, wherein the texture point detection unit detects, as the texture points, points having variations equal to or greater than a preset value in the plurality of frames.

16. The signal processing apparatus of claim 12, further comprising:
a decompression unit for decompressing the compressed video sensor excitation signals, the compressed variables of the texture synthesis filters, and the compressed spatio-temporal location transform variables respectively corresponding to the compressed texture signals;
a texture signal generation unit for generating the plurality of texture blocks using both the video sensor excitation signals and the variables of the texture synthesis filters, and generating each texture signal by adding the plurality of texture blocks;
a matching unit for matching the texture signals with the spatio-temporal location transform variables corresponding to the texture signals;
a visual sensor texture generation unit for generating visual sensor textures using the texture signals and the spatio-temporal location transform variables; and
a visual sensor texture combination unit for combining the generated visual sensor textures corresponding to the respective texture signals, to generate a reconstructed signal.

17. The signal processing apparatus of claim 16, further comprising a correction unit for correcting the reconstructed signal by filtering artifacts occurring at boundaries of combination of the visual sensor textures.

18. The signal processing apparatus of claim 16, further comprising a decomposition unit for decomposing the reconstructed signal into a reconstructed video signal and a reconstructed sensor signal.

* * * * *